United States Patent
Lyubarsky

(10) Patent No.: US 11,209,144 B2
(45) Date of Patent: Dec. 28, 2021

(54) LOW COST PROJECTION SYSTEM

(71) Applicant: Texas Instruments Incorporated, Dallas, TX (US)

(72) Inventor: Alexander Lyubarsky, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/425,517

(22) Filed: May 29, 2019

(65) Prior Publication Data

US 2020/0032979 A1  Jan. 30, 2020

Related U.S. Application Data

(60) Provisional application No. 62/712,055, filed on Jul. 30, 2018.

(51) Int. Cl.
*F21S 41/675* (2018.01)
*F21S 41/20* (2018.01)
*F21S 41/36* (2018.01)

(52) U.S. Cl.
CPC ........... *F21S 41/675* (2018.01); *F21S 41/285* (2018.01); *F21S 41/36* (2018.01)

(58) Field of Classification Search
CPC ........ F21S 41/675; F21S 41/285; F21S 41/36; F21S 41/265; F21S 41/322; F21S 41/24; F21S 41/147; F21S 41/321; F21S 41/365; G02B 19/0061; H04N 9/3152; G03B 21/208
See application file for complete search history.

(56) References Cited

U.S. PATENT DOCUMENTS

| | | | | |
|---|---|---|---|---|
| 6,356,700 B1* | 3/2002 | Strobl | ................. | G02B 6/0006 359/859 |
| 2006/0039140 A1* | 2/2006 | Magarill | ............ | G02B 27/0955 362/227 |
| 2007/0045640 A1* | 3/2007 | Erchak | ................. | G02B 6/0068 257/98 |
| 2015/0377430 A1* | 12/2015 | Bhakta | ................. | F21S 41/176 362/84 |
| 2015/0377442 A1* | 12/2015 | Bhakta | .................... | F21S 41/25 362/510 |
| 2016/0241821 A1* | 8/2016 | Kuroi | .................... | H04N 9/3158 |
| 2016/0377252 A1* | 12/2016 | Bhakta | ................. | F21S 41/675 362/520 |
| 2019/0195459 A1* | 6/2019 | Reisinger | ................ | F21S 41/25 |
| 2019/0317313 A1* | 10/2019 | Oki | .................... | G03B 21/2033 |
| 2019/0368715 A1* | 12/2019 | Tsuda | .................... | F21S 41/675 |

* cited by examiner

*Primary Examiner* — Kevin Quarterman
(74) *Attorney, Agent, or Firm* — Michelle F. Murray; Charles A. Brill; Frank D. Cimino

(57) ABSTRACT

Described examples include a projection system having a light source. The projection system also has a light integrator having an output face, the light integrator configured to receive an output of the light source, wherein a length of the light integrator is less than at least one diametric measurement of the output face of the light integrator. The projection system also has a spatial light modulator and focusing optics configured to receive a light output of the light integrator and configured to focus the light output of the light integrator onto the spatial light modulator. The projection system also has projection optics configured to project modulated light from the spatial light modulator.

16 Claims, 8 Drawing Sheets

WIDTH x HEIGHT: 7.0mm x 3.5mm
LENGTH: 5mm
$\theta_x=26.57°$ ; $\theta_y=8.53°$

CENTER TO EDGE ROLL-OFF: 51%

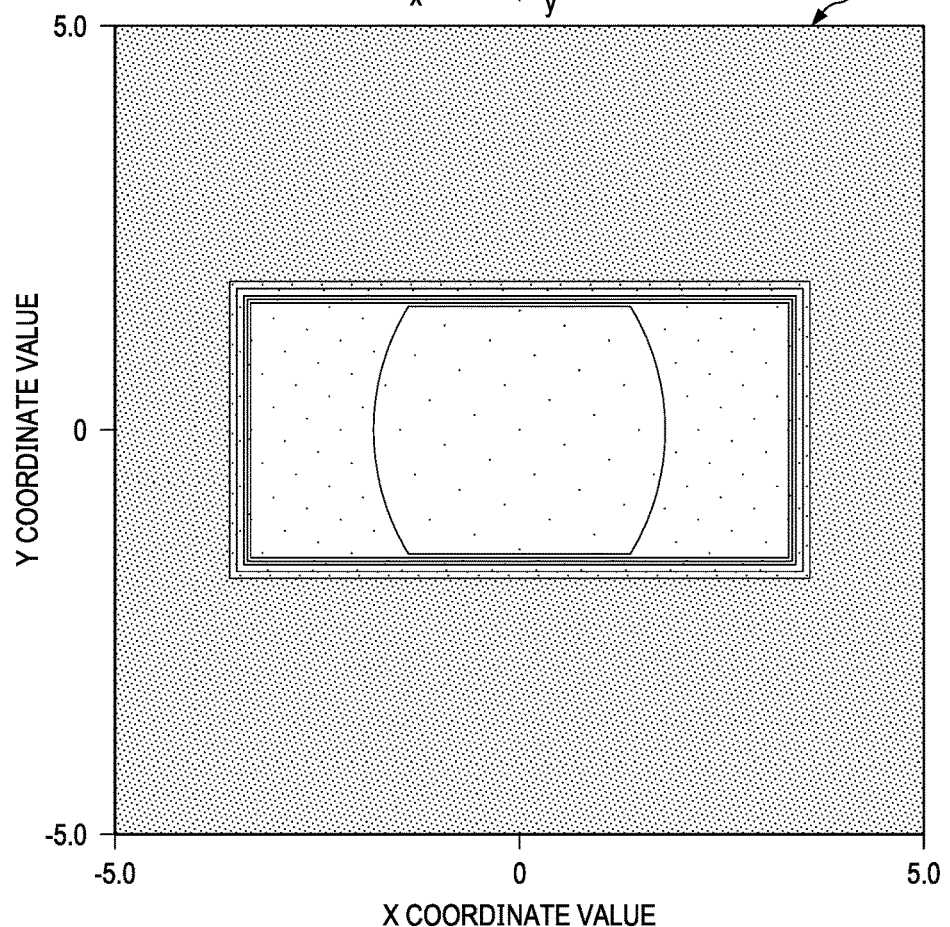
FIG. 10
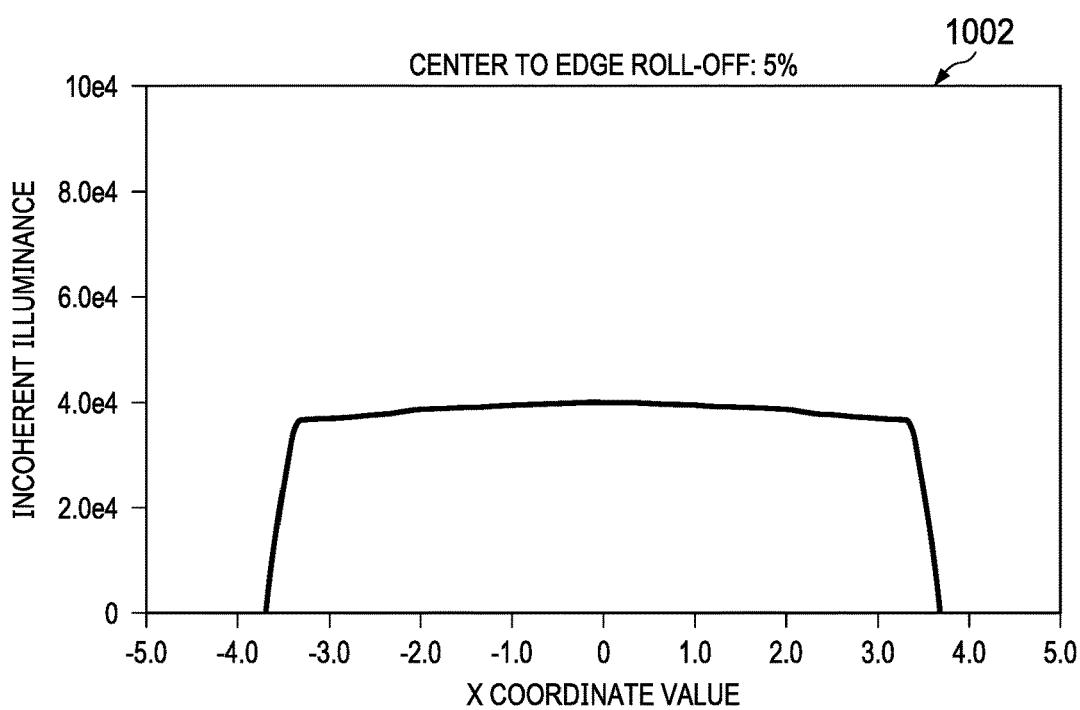

LOW COST PROJECTION SYSTEM

CROSS REFERENCE TO RELATED APPLICATIONS

This application claims the benefit under 35 U.S.C. 119(e) to co-owned U.S. Provisional Patent Application Ser. No. 62/712,055, filed Jul. 30, 2018, entitled "Illumination Architecture for Projection Based Headlights," which is hereby incorporated by reference in its entirety herein.

TECHNICAL FIELD

This relates generally to illumination systems, and more specifically to projection-based illumination systems.

BACKGROUND

Projection systems using spatial light modulators are used in many applications. In these systems, spatial light modulators are illuminated by a light source and the spatial light modulators modulate the light to project a desired image. An example spatial light modulator is a digital micromirror device (DMD). One application of spatial light modulator projection systems is illumination, such as automobile headlights. Modulated headlights provide significant capabilities as opposed to conventional headlights. For example, the illumination can be tailored to avoid blinding on-coming drivers by directing the light to areas away from the windshield of the on-coming automobile. In addition, directions for travel from a geographic positioning system (GPS) can be projected onto the pavement in front of the automobile, allowing the driver to receive turn-by-turn directions without taking his or her eyes from the road. In addition, for autonomous or semi-autonomous vehicles, symbols indicating the direction and speed of the vehicle may be used to aid pedestrians in avoiding the path of the vehicle.

Most spatial light modulator projection systems use uniform light across the spatial light modulator. However, with headlight systems, it is desirable to have a greater light intensity toward the center of the spatial light modulator. To achieve this, complex lens systems direct more of the light to the center of the spatial light modulator. However, these complex lens systems are costly.

SUMMARY

In accordance with an example, a projection system includes a light source. The projection system also includes a light integrator configured to receive an output of the light source, wherein a length of the light integrator is less than at least one diametric measurement of an output face of the light integrator. The projection system also includes a spatial light modulator and focusing optics configured to receive a light output of the light integrator and configured to focus the light output of the light integrator onto the spatial light modulator. The projection system also includes projection optics configured to project modulated light from the spatial light modulator.

BRIEF DESCRIPTION OF THE DRAWINGS

FIG. 10 is a chart showing the output of a simulation of light integrator having a length greater length than the width and height of its output face with a graph showing the light intensity across a horizontal line through the centroid of the output face of the light integrator.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

To provide a more cost-effective illumination system, an example illumination system includes a light integrator having a length such the output light provided by the light integrator is greater in the center than at the periphery of the output light. The projection system also includes a spatial light modulator and focusing optics configured to receive a light output of the light integrator and configured to focus the light output of the light integrator onto the spatial light modulator. The projection system also includes projection optics configured to project modulated light from the spatial light modulator. Because the light integrator provides light that is greater in the center than at the periphery of the output light, the focusing optics do not need to use expensive aspherical lenses and biconic reflectors.

Figure 1:
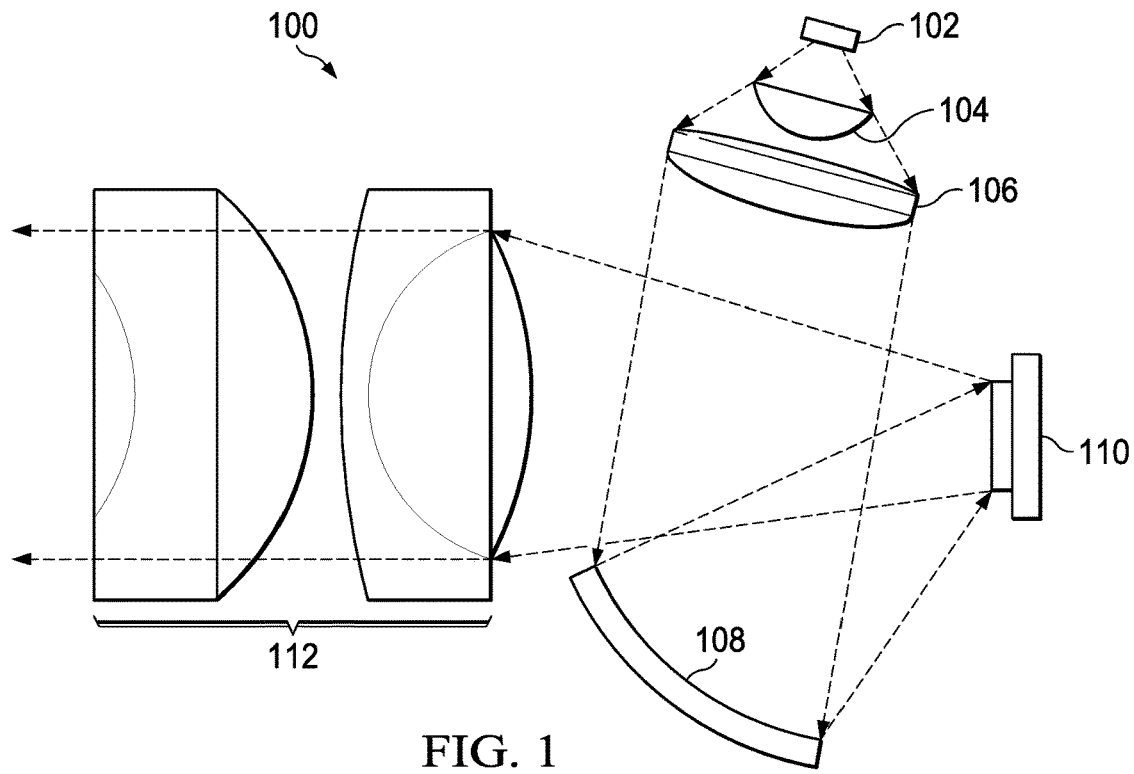
FIG. 1 is a schematic diagram of an illumination system.

FIG. 1 is a schematic diagram of an illumination system 100. Light source 102 is a white light source, such as an LED with phosphors. Light from light source 102 is directed by spherical lens 104 to aspherical lens 106. Light from aspherical lens 106 reflects off biconic mirror 108 to spatial light modulator 110. Biconic mirror 108 may also be toroidal, anamorphic aspherical or freeform. According to signals provided to spatial light modulator 110, light selectively reflects to projection optics 112 in the desired image. Projection optics 112 projects the pattern to the pavement in front of a vehicle, for example.

The combination of spherical lens 104, aspherical lens 106, and biconic mirror 108 combine to convert the relatively uniform light from light source 102 to a light pattern that has a higher concentration of light in the center. That is, the light is brighter (greater luminance) in the middle of spatial light modulator 110 than at the periphery. This provides for a smooth transition from the scene that is illuminated by the projected light to the portion of the scene that is not illuminated by the projected light. However, aspherical lenses and biconic mirrors are difficult to manufacture and thus expensive. Thus, the illumination system 100 is costly.

Figure 2:
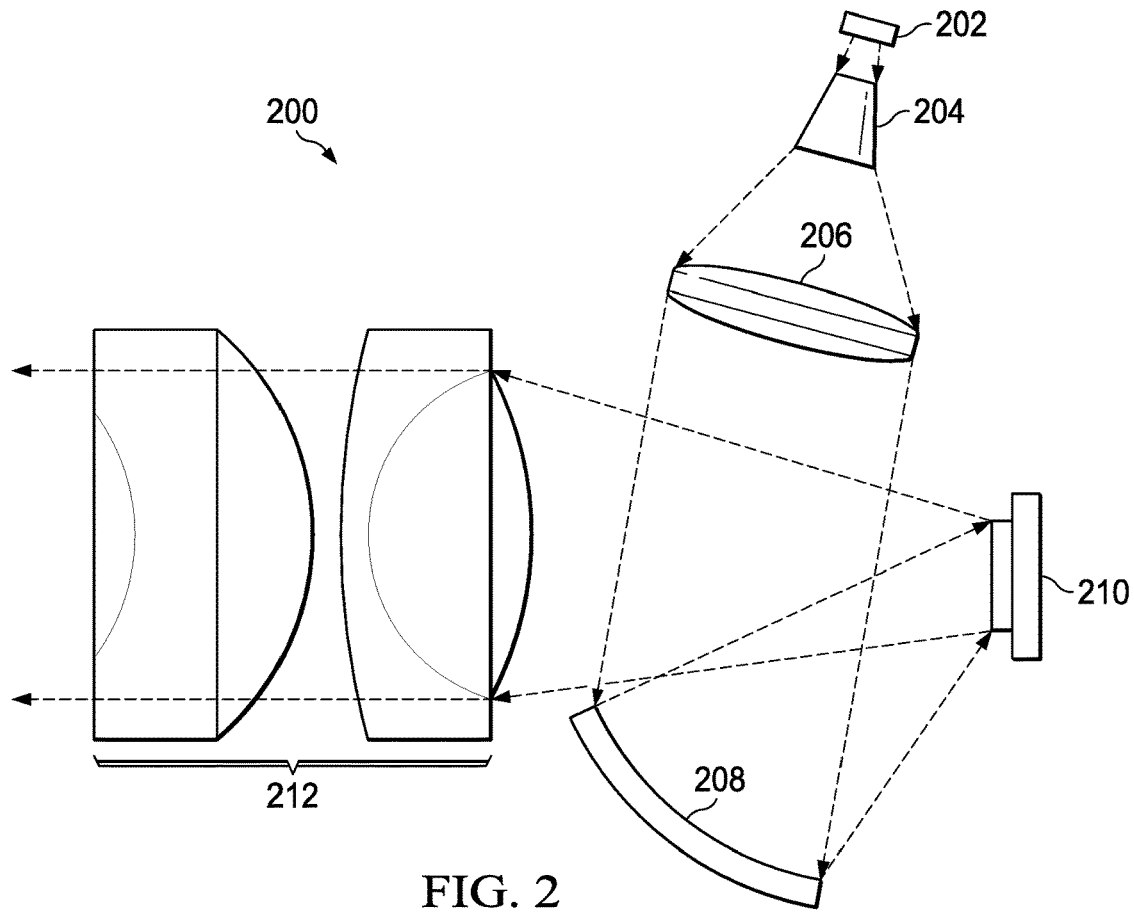
FIG. 2 is a schematic diagram of an example illumination system.

FIG. 2 is a schematic diagram of an example illumination system 200. In this example, illumination system 200 is an automobile head lamp. Light source 202 in this example is a light emitting diode (LED) using phosphors to provide a selected color of light, such as white. Other examples of light source 202 include lasers, laser diodes, high-intensity incandescent light and others. Light from light source 202 passes through light integrator 204. The structure and operation of light integrator 204 is described hereinbelow. The output of light integrator 204 is non-uniform light output such as a light pattern having greater light intensity (luminance) in the center of the pattern relative to the light intensity at the periphery of the pattern. In an example, the light intensity at the center of the pattern provided by light integrator 204 is about 50% greater than the light provided at an edge of the pattern. The output of light integrator 204 is focused by focusing optics including lens 206 and mirror 208 onto spatial light modulator 210. Modulated light from spatial light modulator 210 is then projected using projection optics 212. In this example, light modulator 210 is a digital micromirror device (DMD). Other examples of light modulator 210 include liquid-crystal on silicon (LCOS) and other light modulators. In this example, because light integrator provides a light pattern of the desired size with higher center light intensity (as further explained hereinbelow), lens 206 and mirror 208 can have simple configurations because the is no need for these components to provide the desired light pattern, they simply focus it onto the spatial light modulator. In an example, mirror 208 is a rotationally symmetric reflector, such as a conical reflector. In another example, mirror 208 is spherical. In another example, lens 206 is a spherical lens. Because of light integrator 204, lens 206 and mirror 208 have simple designs, and thus they are less expensive to manufacture than aspherical lens 106 and biconic mirror 108 (FIG. 1). Thus, illumination system 200 is more cost effective than illumination system 100 (FIG. 1).

Figure 3A:
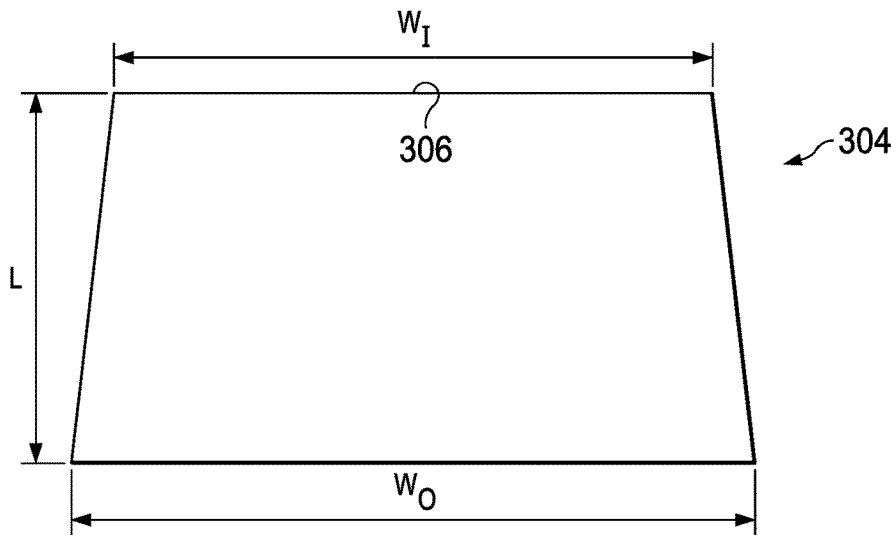
FIGS. 3A through 3C (collectively "FIG. 3") are three views of an example light integrator.
Figure 3B:
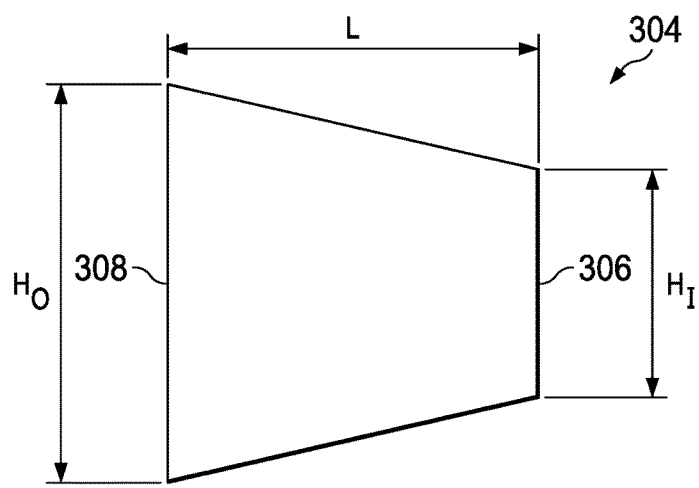
Figure 3C:
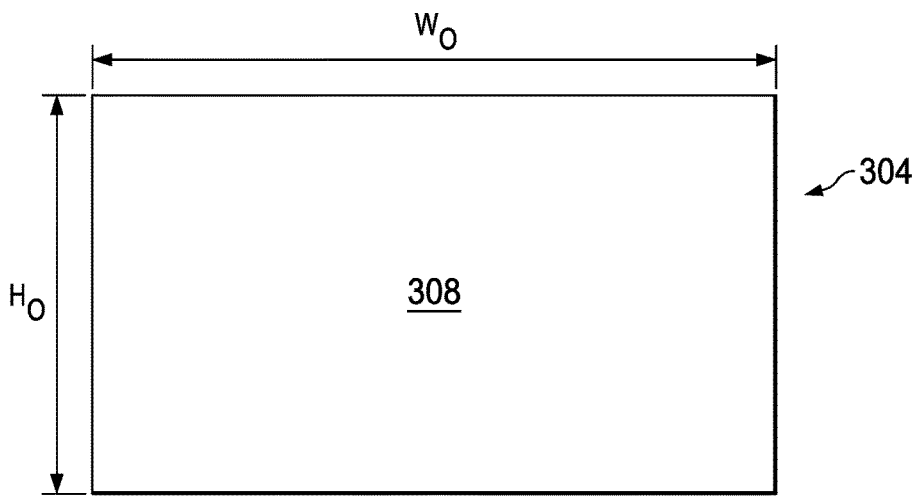

FIGS. 3A through 3C (collectively "FIG. 3") are three views of an example light integrator 304. Light integrator 304 is like light integrator 204 (FIG. 2). As used herein, the term "light integrator" includes light tunnels, integrating rods, light pipes, and compound parabolic concentrators. Although other types of devices perform light integration, such as micro-lens arrays, these other types of devices are not included in the term "light integrator" as used herein. In the example of FIG. 3, light integrator 304 is a light tunnel where the inside surfaces are reflective aluminum, for example. Other examples of light integrator 304 include a rod of optically transparent material with the outside surface coated with a reflective material except for the input face and output face; a rod of optically transparent material that is uncoated that uses total internal reflection (TIR); and others. FIG. 3A is a top view of light integrator 304. As used herein, "top view," "side view," and "front view" are used to describe the relationship between the views of FIG. 3A, FIG. 3B, and FIG. 3C, respectively, and do not indicate any other physical relationship. As shown in FIG. 3A, light input face 306 has a width $W_I$. Light output face 308 has a width $W_O$. Light integrator 304 has a length L. FIG. 3B is a side view of light integrator 304. As shown in FIG. 3B, light input face 306 has a height $H_I$. Light output face 308 has a height $H_O$. FIG. 3C is a front view showing output face 308.

In the example of FIG. 3, $W_P$ is greater than $W_I$ and $H_O$ is greater than $H_I$. Thus, output area of output face 308 is greater than the input area of input face 306. In addition, in this example, $W_O$ and $H_O$ are greater than L. Light integrators are used to convert non-uniform light to uniform light. However, it has been experimentally determined using simulations that, if L is less than either $W_O$ or $H_O$, the output of light integrator 304 produces a light pattern with higher intensity toward the center of the output light pattern, even if uniform light is input into light integrator 304. Thus, by using an integrator like light integrator 304, a light pattern having higher intensity toward the center of the light pattern can be produced without the need for complex (and thus expensive) lenses and/or reflectors. In an example, $W_O$ is 8 mm, $H_O$ is 4.5 mm and L is 4 mm. The configuration of this example provides an output face with a 16:9 aspect ratio that matches the aspect ratio of many spatial light modulators. Thus, this example configuration of light integrator 304 further simplifies the optics necessary to focus the light pattern onto the spatial light modulator because it avoids the need for any anamorphic stretching or shrinking in any direction. With spatial light modulators having other aspect ratios, the dimensions of output face 308 can be configured to match the other aspect ratios. However, although matching the aspect ratio of output face 308 to the spatial light modulator is desirable in certain configurations, it is not necessary. Although specific example measurements are shown above, they do not limit the scope of this example light integrator.

Figure 4A:
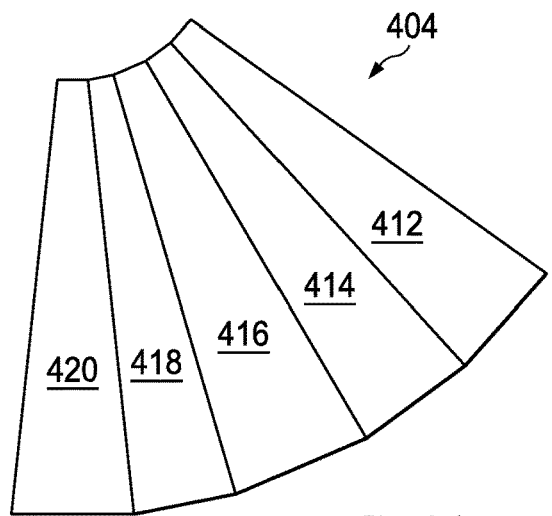
FIGS. 4A and 4B (collectively "FIG. 4") are schematic diagrams illustrating an example method for making an example light integrator.
Figure 4B:
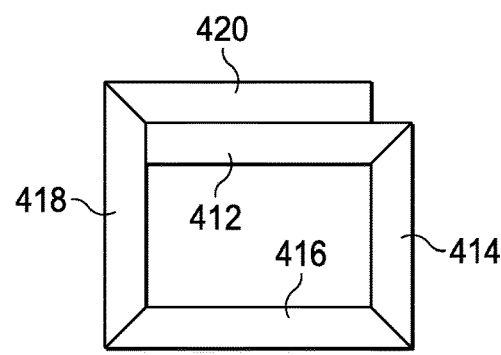

FIGS. 4A and 4B (collectively "FIG. 4") are schematic diagrams illustrating an example method for making an example light integrator 404. The dimensions of FIG. 4 are not to scale, but rather are selected for ease of illustration. FIG. 4A shows example light integrator as a single sheet including panel 412, panel 414, panel 416, panel 418, and panel 420. One side of each of the panels includes a mirrored surface, such as a layer of aluminum. In an example, the example light integrator 404 is a sheet of aluminum with a backing for structural integrity. The sheet is folded at an angle of 90° at the boundary between panels such that panels 412 and 420 fold onto each other. (See, e.g., U.S. Patent Application No. 62/702,739, which is co-owned by the owner of this application and is incorporated herein in its entirety by reference.) Thus, this example light integrator is easy to manufacture, and thus inexpensive.

Figure 5:
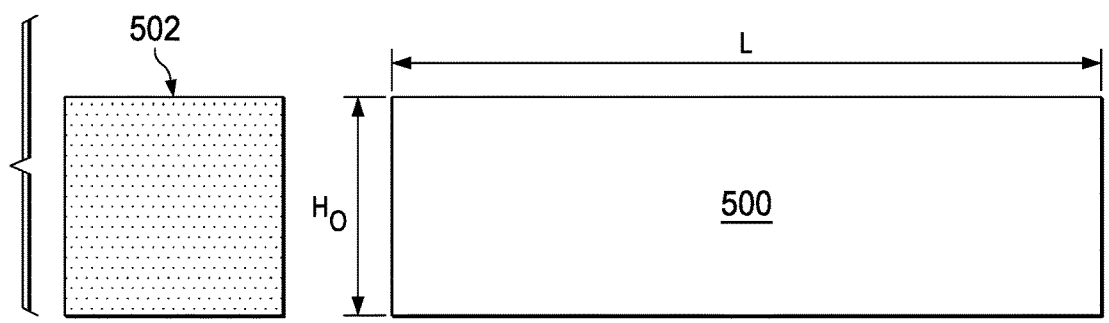
FIG. 5 is an illustration of a light integrator.
Figure 6:
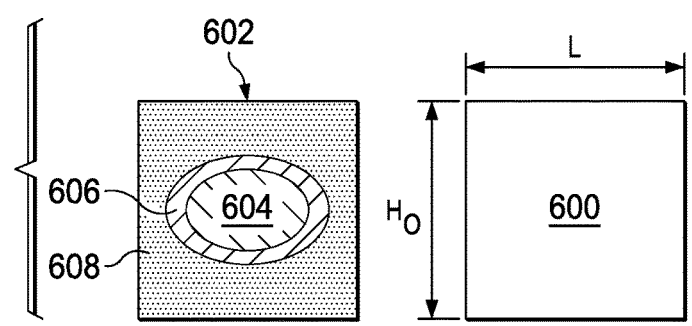
FIG. 6 is an illustration of an example light integrator.

FIG. 5 is an illustration of a light integrator 500 and the resulting output pattern 502. The height $H_O$ of light integrator 500 is less than the length L. Therefore, the output pattern 502 is uniform light. FIG. 6 is an illustration of an example light integrator 600 and the resulting output pattern 602. The height $H_O$ of example light integrator 600 is greater than the length L. The resulting output pattern 602 includes higher intensity area 604, medium intensity area 606 and lower intensity area 608. These areas blend into a continuum of higher intensity toward the center of the output pattern 602 to lower intensity at the periphery of output pattern 602 but are shown as distinct areas for purposes of illustration.

Figure 7:
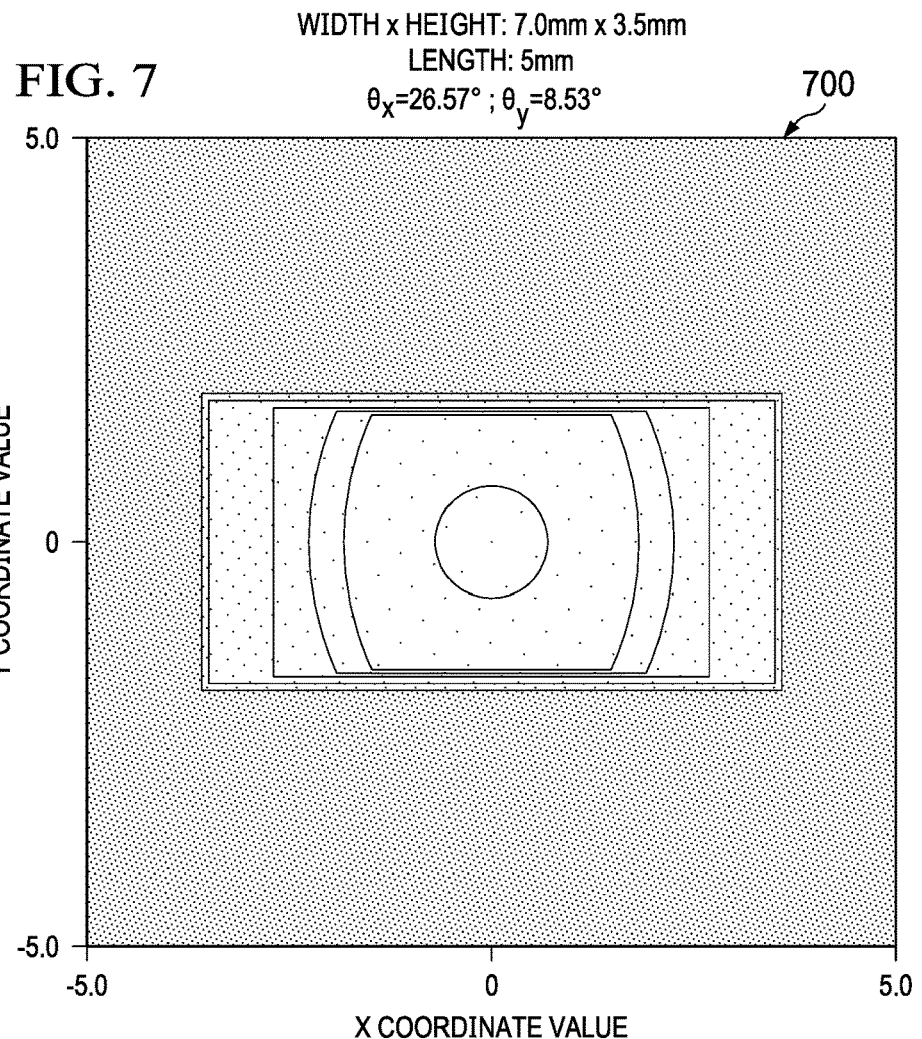
FIG. 7 is a chart showing the output of a simulation of an example light integrator with a graph showing the light intensity across a horizontal line through the centroid of the output face of the light integrator.
Figure 7:
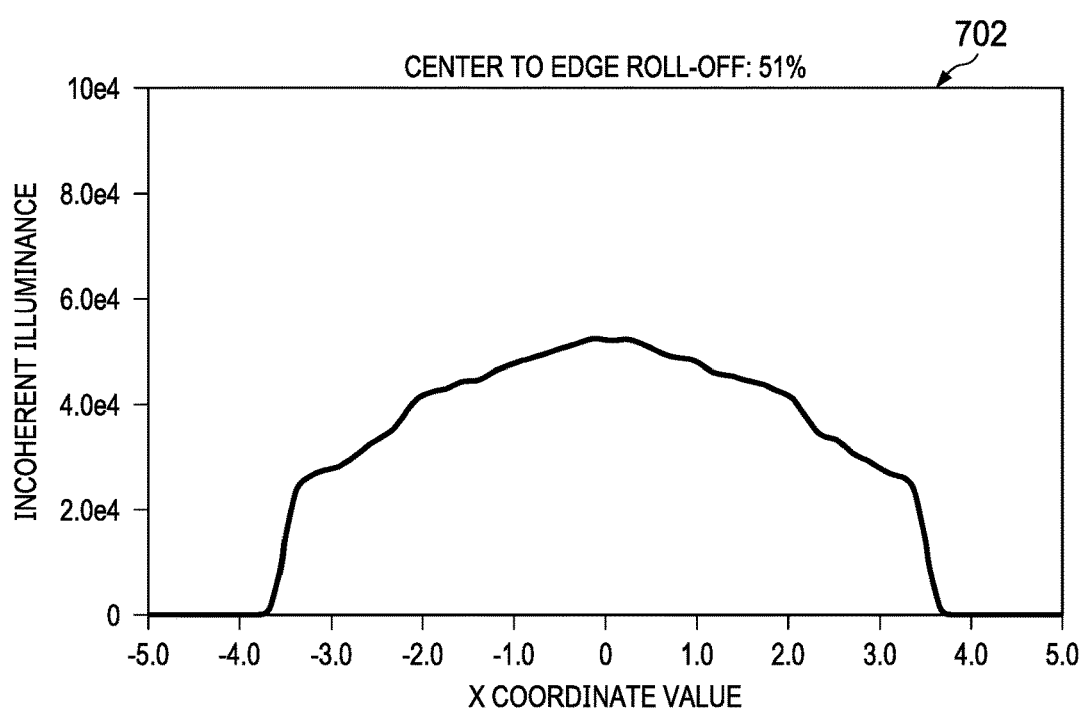

FIG. 7 is a chart showing the output of a simulation of an example light integrator with a graph showing the light intensity across a horizontal line through the centroid of output face of the light integrator. The input face of the integrator in this example is 2 mm×2 mm. As shown at the top of FIG. 7, in this example, the light integrator is a light tunnel with a length of 5 mm, an output face width of 7 mm and an output face height of 3.5 mm. With these dimensions, the spread angle (the angle of the walls of the example light integrator relative to the central axis of the example light integrator) in the x coordinate direction $\theta_x$ is 26.57° and the spread angle in the y coordinate direction $\theta_y$ is 8.53°. Chart 700 shows the greater intensity of light at the center of the output pattern relative to the periphery of the output pattern along a line in the x coordinate direction through the centroid of the output face. Graph 702 shows that the light intensity at outside edges of the output of the example light integrator is 51% lower than the light intensity at the center of the output of the example light integrator.

Figure 8:
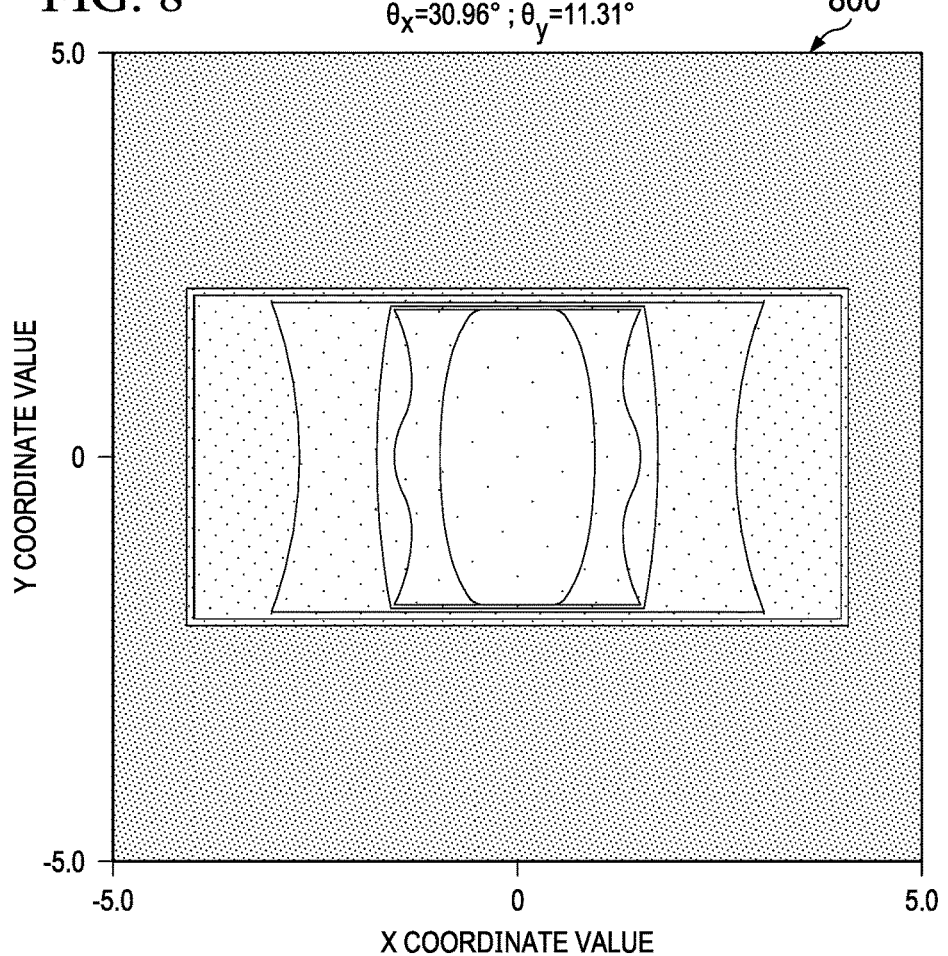
FIG. 8 is a chart showing the output of a simulation of another example light integrator with a graph showing the light intensity across a horizontal line through the centroid of the output face of the light integrator.
Figure 8:
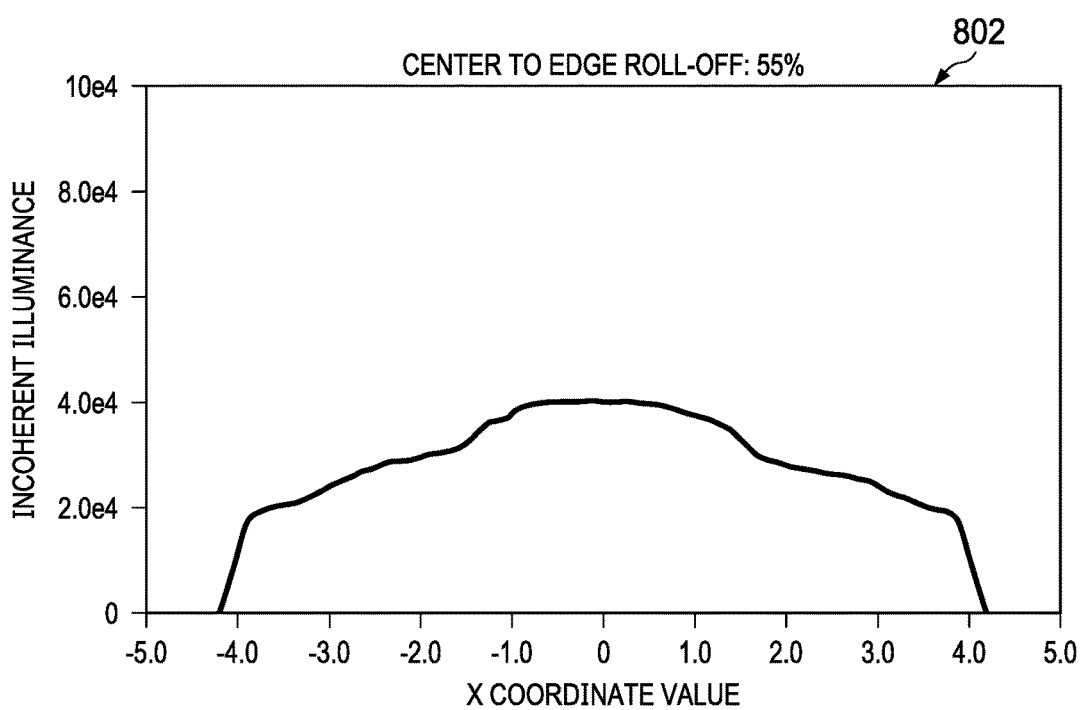

FIG. 8 is a chart showing the output of a simulation of another example light integrator with a graph showing the light intensity across a horizontal line through the centroid of output face of the light integrator. The input face of the integrator in this example is 2 mm×2 mm. As shown at the top of FIG. 8, in this example, the light integrator is a light tunnel with a length of 5 mm, an output face width of 8 mm and an output face height of 4 mm. With these dimensions, the spread angle in the x coordinate direction $\theta_x$ is 30.96° and the spread angle in the y coordinate direction $\theta_y$ is 11.31°. Chart 800 shows the greater intensity of light at the center of the output pattern relative to the periphery of the output pattern along a line in the x coordinate direction through the centroid of the output face. Graph 802 shows that the light intensity at outside edges of the output of the example light integrator is 55% lower than the light intensity at the center of the output of the example light integrator.

Figure 9:
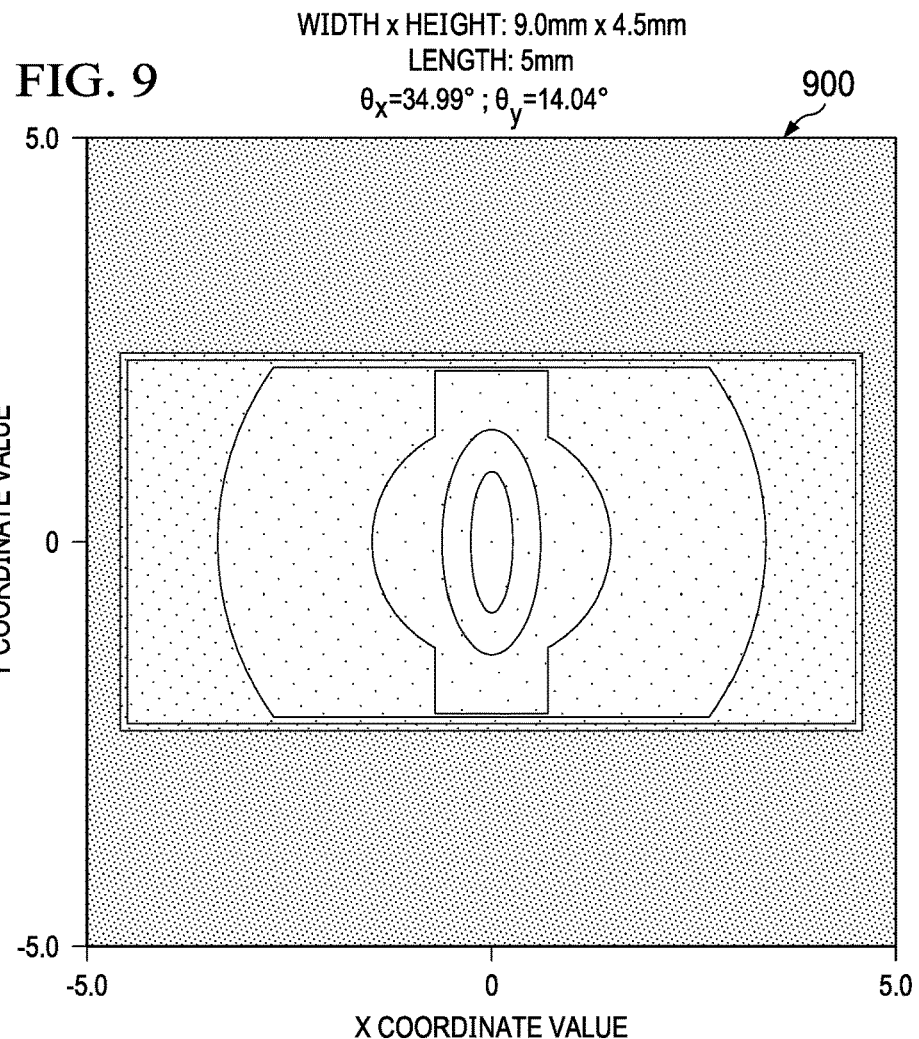
FIG. 9 is a chart showing the output of a simulation of another example light integrator with a graph showing the light intensity across a horizontal line through the centroid of the output face of the light integrator.
Figure 9:
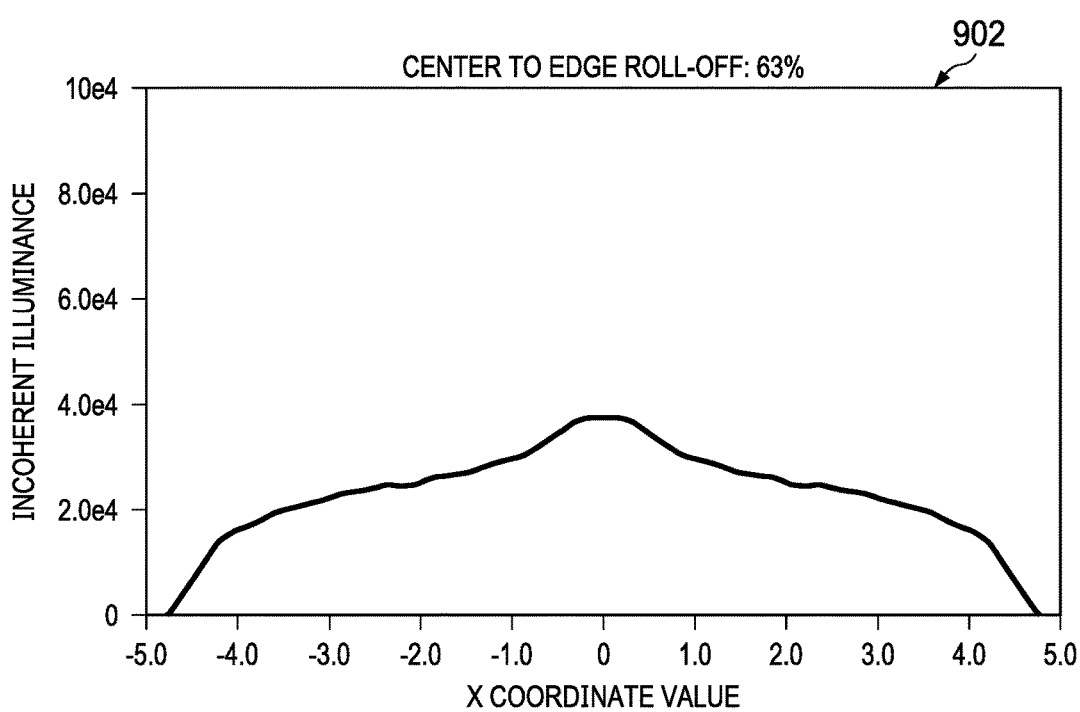

FIG. 9 is a chart showing the output of a simulation of another example light integrator with a graph showing the light intensity across a horizontal line through the centroid of output face of the light integrator. The input face of the integrator in this example is 2 mm×2 mm. As shown at the top of FIG. 9, in this example, the light integrator is a light tunnel with a length of 5 mm, an output face width of 9 mm and an output face height of 4.5 mm. With these dimensions, the spread angle in the x coordinate direction $\theta_x$ is 34.99° and the spread angle in the y coordinate direction $\theta_y$ is 14.04°. Chart 900 shows the greater intensity of light at the center of the output pattern relative to the periphery of the output pattern along a line in the x coordinate direction through the centroid of the output face. Graph 902 shows that the light intensity at outside edges of the output of the example light integrator is 63% lower than the light intensity at the center of the output of the example light integrator.

FIG. 10 is a chart showing the output of a simulation of light integrator having a length greater length than the width and height of its output face with a graph showing the light intensity across a horizontal line through the centroid of output face of the light integrator. The input face of the integrator in this example is 2 mm×2 mm. As shown at the top of FIG. 10, in this example, the light integrator is a light tunnel with a length of 10 mm, an output face width of 7 mm and an output face height of 3.5 mm. With these dimensions, the spread angle in the x coordinate direction $\theta_x$ is 14.04° and the spread angle in the y coordinate direction $\theta_y$ is 4.29°. Also, with these dimensions, the length of the light integrator is greater than the diagonal dimension of the output face, which is 7.83 mm, and thus the length of light integrator is greater than any dimension of the output face of the light integratory. Chart 1000 shows that the light intensity of light across the output face of the light integrator is approximately uniform. Graph 1002 shows that the light intensity at outside edges of the output of the example light integrator is only 5% lower than the light intensity at the center of the output of the example light integrator.

Figure 11:
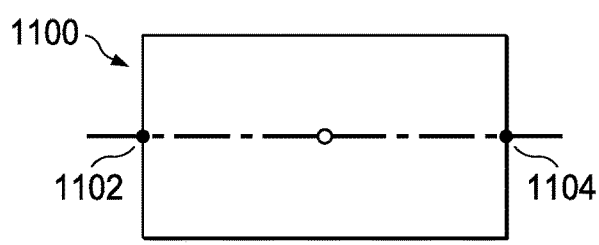
FIG. 11 is a diagram showing the output face of an example light integrator.
Figure 12:
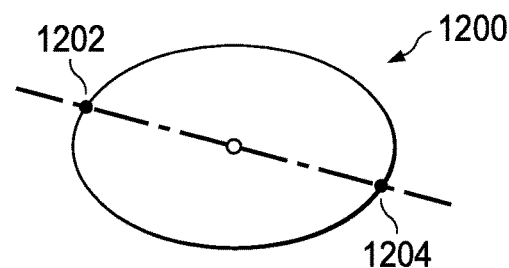
FIG. 12 is a diagram showing the output face of another example light integrator.
Figure 13:
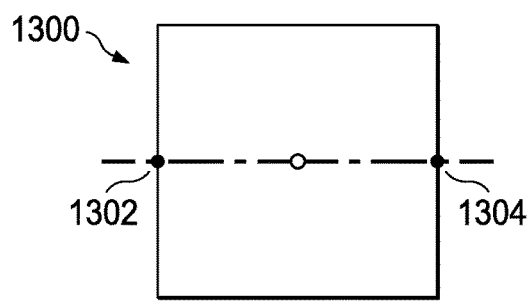
FIG. 13 is a diagram showing the output face of another example light integrator.
Figure 14:
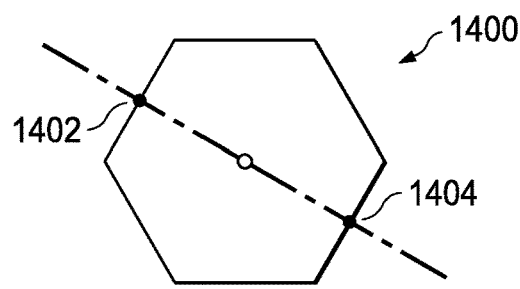
FIG. 14 is a diagram showing the output face of another example light integrator.

FIG. 11 is a diagram showing the output face of an example light integrator. In this case, output face 1100 is a rectangle. FIG. 12 is a diagram showing the output face of another example light integrator. In this case output face 1200 is an oval. FIG. 13 is a diagram showing the output face of another example light integrator. In this case, output face 1300 is a square. FIG. 14 is a diagram showing the output face of another example light integrator. In this case, output face 1400 is a hexagon. The examples of FIGS. 11-14 show that the output face of example light integrators is not limited to any specific geometric configuration. In addition, the geometric configuration of the input face of the light integrator is not limited to any geometric configuration and need not correspond to the geometric configuration of the output face. With the described examples, at least one diametric measurement of the output face is larger than the length of the light integrator. As used herein, a "diametric measurement" means, for a line that passes through the geometric center or centroid of the output face, the "diametric measurement" is the distance between the two points on the line where the line intersects with the border of the output face. For example, the distance between points 1102 and 1104 is a diametric measurement of output face 1100 (FIG. 11). As another example, the distance between points 1202 and 1204 is a diametric measurement of output face 1200 (FIG. 12). As another example, the distance between points 1302 and 1304 is a diametric measurement of output face 1300 (FIG. 13). As another example, the distance between points 1402 and 1404 is a diametric measurement of output face 1400 (FIG. 14).

Figure 15:
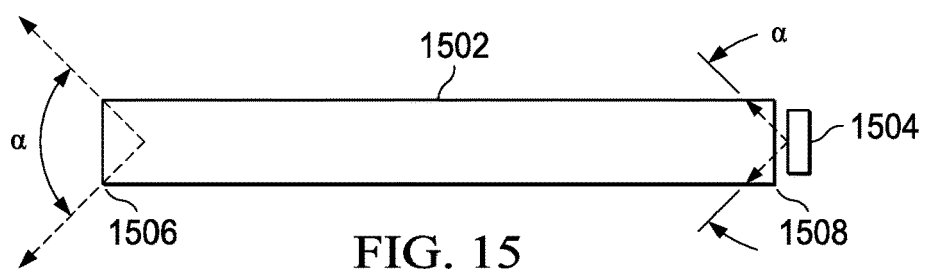
FIG. 15 is a diagram of an example light integrator where the output face has the same size as the input face.

FIG. 15 is a diagram of an example light integrator 1502 where the output face 1506 has the same size as the input face 1508. With a light source 1504 in proximity to input face 1508, the full spread angle α of the light output from light source 1504 enters the integrator. In this configuration, light integrator 1502 cannot be a light rod unless the light rod has mirror coated surfaces. This is because, the angle of reflection for the light from light source 1504 is too great for total internal reflection (TIR). Therefore, without reflective surfaces, too much of the output of light source 1504 would pass through the walls of light integrator 1502 and not propagate to output face 1506. Because the walls of light integrator 1502 are parallel to the propagation direction of the light, the output spread angle is also α.

Figure 16:
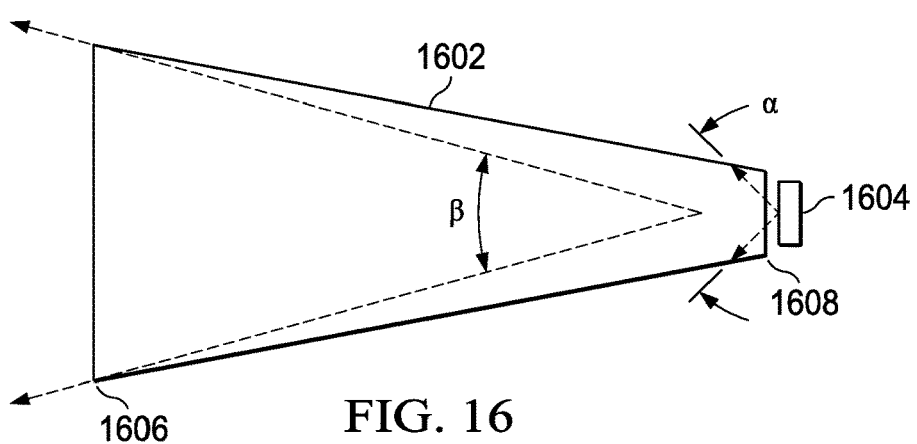
FIG. 16 is a diagram of an example light integrator where the output face has a larger size than the input face.

FIG. 16 is a diagram of an example light integrator 1602. In this example, output face 1606 is larger than input face 1608. Light source 1604 provides light having a spread of α. However, because the walls of light integrator 1602 are not parallel to the propagation direction of the light, light from light source 1604 reflects at a more oblique angle Therefore, the output spread angle β is a smaller angle than α. This smaller angle allows for simpler lens and reflector configurations for focusing the light onto the spatial light modulator or any other selected target. In addition, this configuration may allow for the use of TIR-based integrator rods because the angle of reflection of incoming light is more oblique.

Modifications are possible in the described examples, and other examples are possible, within the scope of the claims.

What is claimed is:

1. A projection system comprising:
a light source configured to produce generated light;
a light integrator having an output face, the light integrator configured to produce non-uniform light at the output face in response to the generated light, wherein the generated light is more uniform than the non-uniform light;
a spatial light modulator;
focusing optics configured to focus the non-uniform light towards the spatial light modulator to produce focused light, wherein the spatial light modulator is configured to modulate the focused light, to produce modulated light; and
projection optics configured to project the modulated light.

2. The projection system of claim 1, wherein the light integrator is a light tunnel.

3. The projection system of claim 1, wherein the spatial light modulator is a digital micromirror device.

4. The projection system of claim 1, wherein the projection system is an automobile head lamp.

5. The projection system of claim 1, wherein an output area of the output face is greater than an input area of an input face of the light integrator.

6. The projection system of claim 1, wherein a length of the light integrator is less than at least one diametric measurement of the output face.

7. The projection system of claim 1, wherein the focusing optics comprises a rotationally symmetric reflector.

8. The projection system of claim 1, wherein the spatial light modulator is a liquid-crystal on silicon device.

9. A projection system comprising:
a light integrator having an output face and an input face, the light integrator configured to receive input light and produce output light in response to the input light, wherein a length of the light integrator is less than at least one diametric measurement of the output face, and wherein an output area of the output face is greater than an input area of the input face;
a spatial light modulator;
focusing optics configured to focus the output light towards the spatial light modulator to produce focused light, wherein the spatial light modulator is configured to produce modulated light in response to the focused light; and
projection optics configured to project the modulated light.

10. The projection system of claim 9, wherein the light integrator is a light tunnel.

11. The projection system of claim 9, wherein the spatial light modulator is a digital micromirror device.

12. The projection system of claim 9, wherein the projection system is an automobile head lamp.

13. The projection system of claim 9, wherein the light integrator is a light pipe.

14. The projection system of claim 9, wherein the focusing optics include a spherical lens.

15. The projection system of claim 9, wherein the focusing optics include a conical reflector.

16. The projection system of claim 9, wherein the spatial light modulator is a liquid-crystal on silicon device.

* * * * *